United States Patent [19]

Giorgi

[11] 3,986,384
[45] Oct. 19, 1976

[54] VARIABLE CONTRAST PASSIVE INFRARED TARGET

[75] Inventor: Colin M. Giorgi, Tucson, Ariz.

[73] Assignee: The United States of America as represented by the Secretary of the Army, Washington, D.C.

[22] Filed: Feb. 4, 1976

[21] Appl. No.: 655,305

[52] U.S. Cl. .............................. 73/1 F; 73/355 R; 250/252; 250/511; 356/243
[51] Int. Cl.² ..................... G01K 15/00; G01J 1/02
[58] Field of Search ........... 73/1 F, 355 R, 355 EM; 116/131, 135; 250/252, 505, 511; 350/266, 280; 356/243

[56] References Cited
UNITED STATES PATENTS

| | | | |
|---|---|---|---|
| 3,188,473 | 6/1965 | Bates et al. | 73/355 R X |
| 3,492,869 | 2/1970 | Toyota et al. | 73/355 EM |
| 3,942,899 | 3/1976 | Longhenry | 356/243 X |

Primary Examiner—Richard C. Queisser
Assistant Examiner—John S. Appleman
Attorney, Agent, or Firm—Nathan Edelberg; Robert P. Gibson; Saul Elbaum

[57] ABSTRACT

An incrementally controllable, variable contrast, passive, infrared target unit comprised of a sandwich of three plates. The center plate is incrementally slidable between the front and rear plates and has at least a perforation pattern therein which is disposed behind at least a cut-out in the front plate. The front and center plates are painted with high emissivity paint and the rear plate has a low emissivity front surface except for at least a pattern of high emissivity areas painted thereon identical to the perforation pattern. By adjusting the position of the center plate the unit can be incrementally controlled from maximum contrast where none of the high emissivity area of the pattern on the rear plate is behind the perforations on the center plate to zero contrast where only the high emissivity areas are behind the perforations.

7 Claims, 7 Drawing Figures

VARIABLE CONTRAST PASSIVE INFRARED TARGET

RIGHTS OF THE GOVERNMENT

The invention described herein may be manufactured, used, and licensed by or for the United States Government for governmental purposes without the payment to me of any royalty thereon.

The present invention is directed to a variable contrast, passive infrared target unit.

By way of background, recent developments in infrared testing have produced a requirement to evaluate spatial resolution and thermal sensitivity as a combined characteristic known as minimum resolvable temperature. This measurement necessitates the use of a target which presents a known spatial pattern such as a bar group and also presents a known bar to background radiance differential.

Further, a basic problem involved in testing advanced infrared sensors and systems is providing a spatial target whose surface presents a known and controllable thermal contrast in the order of 0.01° C.

Existing infrared targets are of two types, passive and active. Passive targets are produced by painting a surface with coatings or paints that have different infrared emissivity characteristics which produce a fixed effective temperature differential when both materials are at the same temperature. Active targets, on the other hand, utilize heating or cooling of a surface and can provide a range of thermal contrasts.

Conventional passive targets are therefore unsuitable for infrared sensor testing because they provide a fixed thermal contrast as opposed to a controllable range. Active targets, while providing such a range, require large amounts of electrical power, are difficult to control, lack uniformity over large areas such as required by field targets, create problems in thermally isolating bar and background, and require excessive heat-up and cool-down times (minutes to hours) to cycle through zero contrast. As a result, neither conventional passive nor active targets can be utilized for field evaluations of infrared system minimum resolvable temperature at operational ranges.

It is therefore an object of the invention to provide a target which can be rapidly cycled through a complete and precise range of effective thermal contrasts such as are required to perform the minimum resolvable temperature measurement.

It is a further object of the invention to provide a laboratory of field type spatial infrared target which can be controlled to produce effective temperature differentials in the order of 0.01° C.

It is still a further object of the invention to provide a target having the advantages of a passive target but having an incrementally controllable range of contrasts.

The above objects are accomplished by providing a target unit which is comprised of a sandwich of three plane members, the second or center member being incrementally slidable between the front and rear members. The front member has at least a cut-out therein which exposes the center member and the center member has a pattern of openings in the area exposed by the cut-out which openings expose the rear member. The front surfaces of the front and center member are painted with a high emissivity paint (black) while the front of the rear surface is of a lower emissivity except for a pattern of high emissivity areas behind the openings in the center member, which pattern is identical to the pattern of openings in the center member. Therefore with the center member positioned so that the pattern of openings directly overlies the pattern of high emissivity areas on the rear member, the target has zero contrast. The center member is then incrementally moveable through positions where less than all of the high emissivity areas show behind the pattern of openings and finally to a position where only the low emissivity part of the rear member is visible behind the pattern of openings. Hence by incrementally moving the center member a whole range of contrasts is available.

The invention will be better understood by referring to the accompanying drawings in which.

The principle of the target unit is based on the difference in emissivity between an unpainted aluminum surface (approximately 0.50 emissivity) and the same surface painted with a high emissivity paint such as 3M velvet black (approximately 0.90 emissivity). This emissivity difference produces a radiance differential of approximately 25° over the 8 to 14 micrometer wave length region. By physically introducing an average emissivity change through a sliding perforated plate, a specific total range and incremental change in radiance can be produced. The specific target characteristics are determined by emissivity contrast of the materials, the area relationship between the perforations and the un-perforated portion of the sliding plate and the rate of change in area of exposed rear plate as a function of center plate movement.

Figure 1:
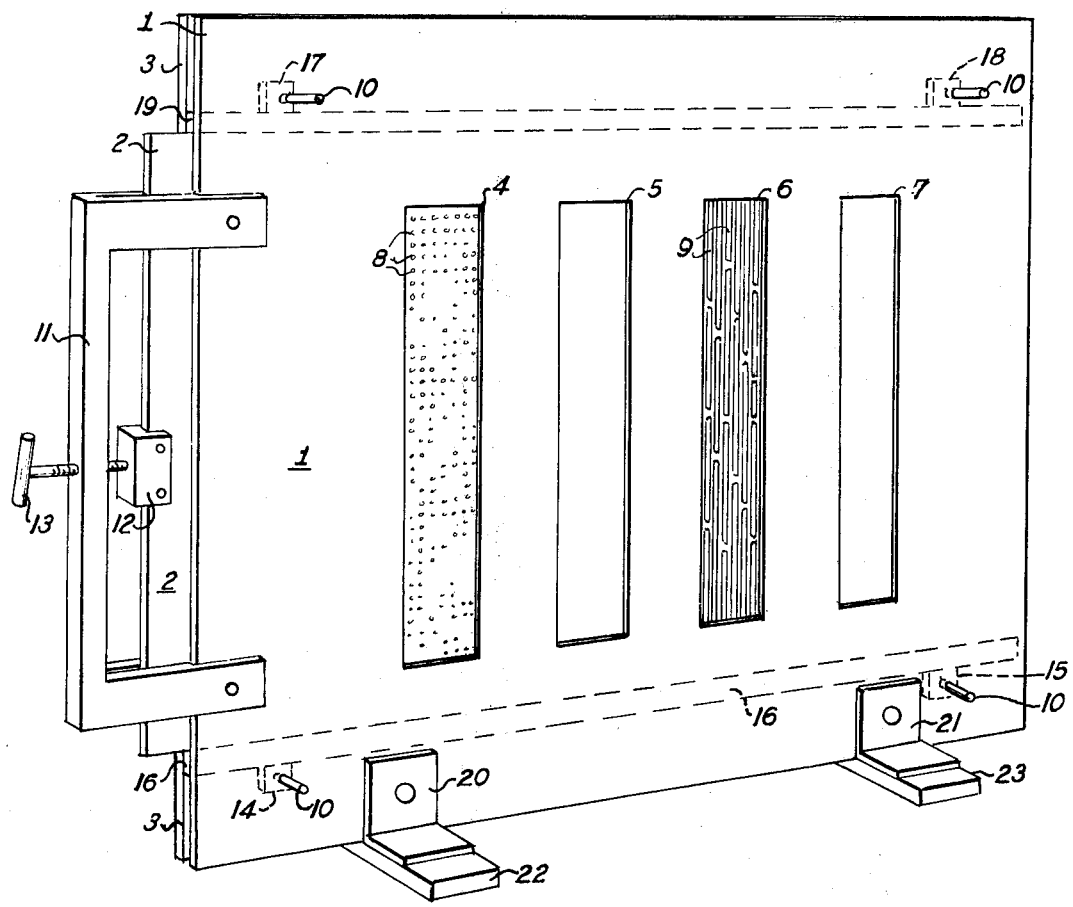
FIG. 1 is a front view of a device incorporating the invention.

Referring to FIG. 1, the device is seen to comprise a sandwich made up of front plate 1, rear plate 3, and sliding center plate 2. Front plate 1 has four vertical bar or cut-out sections, 4, 5, 6 and 7 removed therefrom. The front surface of front plate 1 is painted with a high emissivity paint and looks black.

Figure 2:
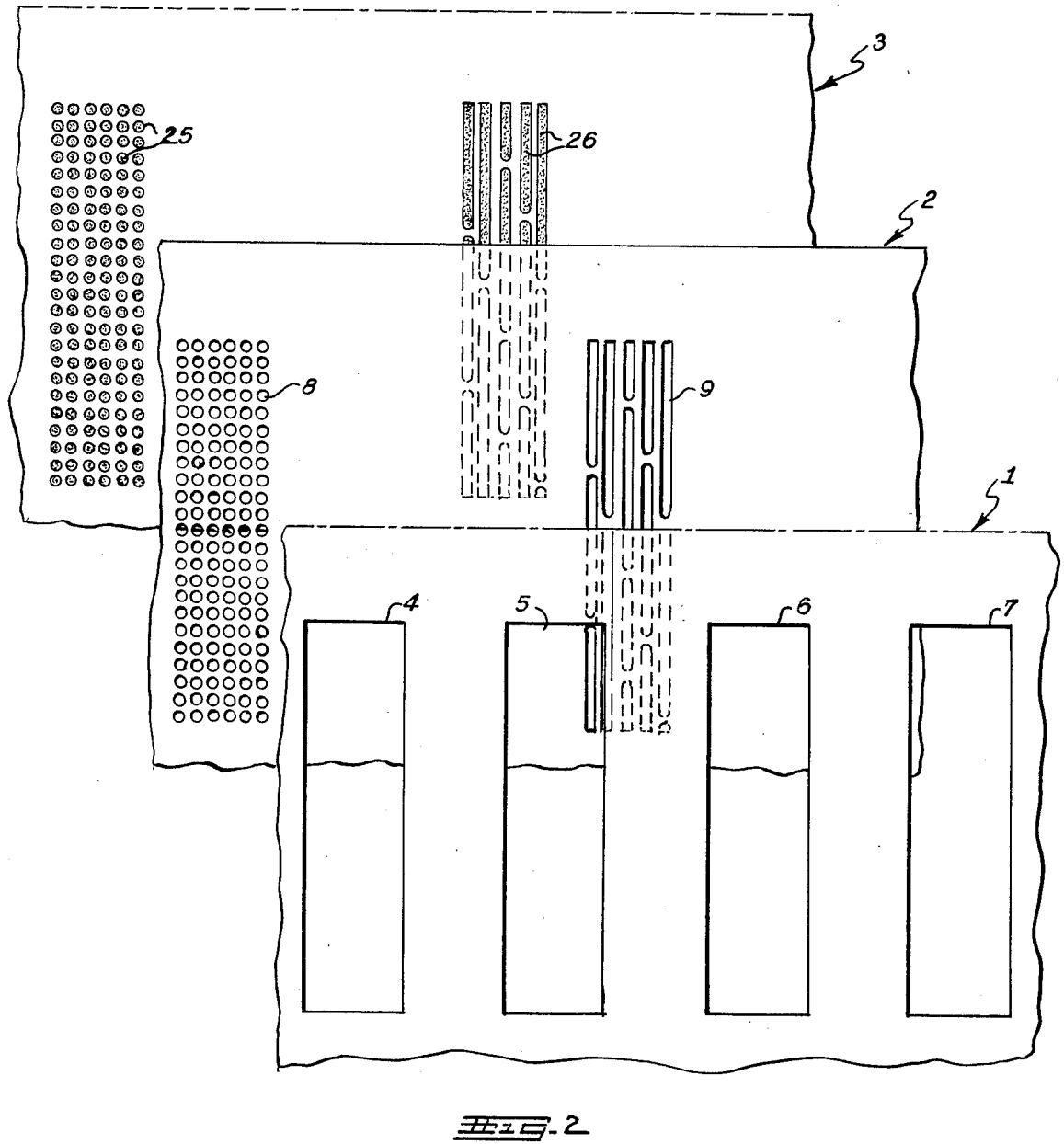
FIG. 2 is a partial exploded view of the front, central, and rear members.

Center plate 2 is shown more clearly in FIG. 2 where it is seen to have two patterns of openings disposed therein. The first such pattern 8 is a column and row matrix of round perforations and the second such pattern 9 is a group of columns of elongated slits with the positions of the slits being staggered in adjacent columns. With plate 2 inserted in the above-mentioned sandwich, the groups of openings 8 and 9 are disposed behind the area of cut-outs 4 and 6 respectively of front plate 1. The front surface of center plate 2 is coated with high emissivity paint. The rear plate may be aluminum as may be the other two, and it is identical in size to the front plate. The rear plate however is unpainted except for two patterns of high emissivity areas identical to hole patterns 8 and 9 respectively, which patterns are painted on the rear plate so as to be disposed behind cut-outs 4 and 6 of the front plate. Thus, with the center plate adjusted as shown in FIGS. 3 and 5 behind each perforation 8 of center plate 2 there is a black circular spot and behind each slit-like opening 9 there is a black slit-shaped region.

As the center plate is moved, a portion of the low emissivity surface area of the aluminum back plate is exposed, thereby reducing the average emissivity and hence the radiance from the perforated bar area. As the center plate is moved further, more of the aluminum back plate is exposed until a maximum contrast is produced between the face plate and the bar group. In the maximum contrast position all of the high emissivity areas 25 and 26 are covered by the center plate 2 whereas the unpainted low emissivity surface area of plate 3 is exposed through the perforations in plate 2.

Figures 5, 6, 7:
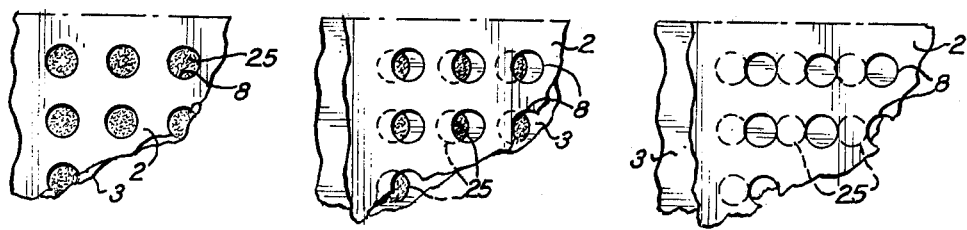
FIGS. 5, 6 and 7 are partial front views showing the center member adjusted for zero, 50% and maximum contrast respectively.
Figures 3, 4:
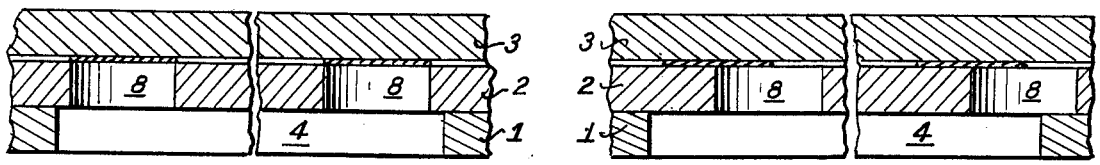
FIG. 3 is a partial sectional view showing the center member in a position where the pattern of openings directly overlies the high emissivity areas of the rear member.
FIG. 4 is a partial sectional view showing the center member in a position where the pattern of openings partially overlies the high emissivity areas.

FIGS. 3 and 5 show the center plate aligned for zero contrast, while FIG. 7 shows it aligned for maximum contrast and FIGS. 4 and 6 show it aligned for 50% reduction from maximum contrast. Hence the device of the invention is incrementally adjustable to provide a range of thermal contrasts.

Two types of perforations were designed for purposes of experimentation, but a working model may have only one type of perforation. The two un-perforated bars or cut-outs, 5 and 7, were provided as control bars to assure that the contrast changes were not due to thermal differentials between the front plate and the center plate.

The specific mechanical construction can take a variety of specific forms as known to those skilled in the art. In the embodiment shown in FIG. 1, plates 1 and 3 are secured together by four bolts 10 and runner-blocks 14 and 15 are provided for accommodating a captive teflon runner-strip 16 therebetween. Upper runner-blocks 17 and 18 similarly accommodate upper teflon runner strip 19. Center plate 2 is thus slidable between the two teflon runner-strips and may be adjusted by control screw 13 which is attached to screw drive holder 12 after being passed through a hole in bracket 11. Additionally, the embodiment shown has two feet 22 and 23 to which the device is attached by foot brackets 20 and 21 respectively.

In a specific embodiment which was built, the front and rear plates were 24 inches by 18 inches and each bar or cut-out on the front plate was 2 inches wide by 10 inches long. The matrix of round perforated holes was approximately 7 across by 39 down.

With the above-identified model, a Barnes Engineering Co., Stamford, Connecticut, Model PRT-5 Precision Radiation Thermometer (radiometric type) was used to measure the change in effective temperature as a function of center plate mask movement. At an ambient temperature of 23° C the vertical section perforations produced a continuously variable contrast range of 0 to −3° C while the small circular perforations produced a contrast range over the complete displacement of only 0 to −0.75° C. By using a finer hole pattern and painting the back plate with about a 0.75 emissivity paint, the present invention is expected to provide a controlled target capability which will exceed state of the art infrared detector sensitivity capability.

The disclosed target technique can be readily applied to a field configuration by scaling up the dimensions to suit the field test requirements. Sheets of 4 feet × 8 feet masonite or aluminum plate can be used to provide a highly economical field target. Greater precision can be obtained by using a geared, motor driven assembly to move the perforated center plate, which arrangement would also permit remote, automatic or programmed control of the contrast levels. A feedback loop could be accomplished by tying the output of the ground based monitor radiometers to the drive system.

I wish it to be understood that I do not desire to be limited to the exact details of construction shown and described, for obvious modifications can be made by a person skilled in the art.

What is claimed is:

1. An incrementally controllable variable contrast passive infrared target unit comprising stationary front and rear plane members and a center plane member sandwiched therebetween, said front member having at least one cut-out therein, said center member having a pattern of openings disposed behind each said cut-out, the front surfaces of said front and center members being of a relatively high infrared emissivity and the front surface of said rear member behind said at least one cut-out varying between relatively high and relatively low infrared emissivities and means for incrementally sliding said center member between said front and rear members, whereby higher or lower emissivity surface is exposed behind said openings.

2. The target unit of claim 1 wherein said front surface of said rear member is of a relatively low infrared emissivity except for a pattern of relatively high emissivity areas behind said at least one cut-out, said pattern being the same as said pattern of openings in said center member and each of said relatively high emissivity areas being approximately the same size as each of said openings, whereby said center member can be incrementally positioned by said means for sliding from a position where there is a high emissivity area behind each opening to a position where all of said high emissivity areas are covered by said center member and there is a relatively low emissivity surface area behind each opening.

3. The target unit of claim 2 wherein said pattern of openings comprises a row and column matrix of round openings.

4. The target unit of claim 2 wherein said pattern of openings comprises a pattern of elongated slit-like openings.

5. The target unit of claim 4 wherein said pattern comprises a series of adjacent columns of said openings with the positions of the openings being staggered in adjacent columns.

6. The target unit of claim 2 wherein besides said at least one cut-out said front member has at least one control cut-out, said center member being arranged so that only its relatively high emissivity front surface portion is exposed behind said at least one control cut-out over the entire range of operating movement of said center member.

7. The target unit of claim 2 wherein said cut-outs are rectangular in shape.

* * * * *